Sept. 2, 1958  G. L. DAVIS  2,850,123
BRAKE ADJUSTING APPARATUS
Filed May 11, 1956  3 Sheets-Sheet 1

INVENTOR
Glyndwr L. Davis

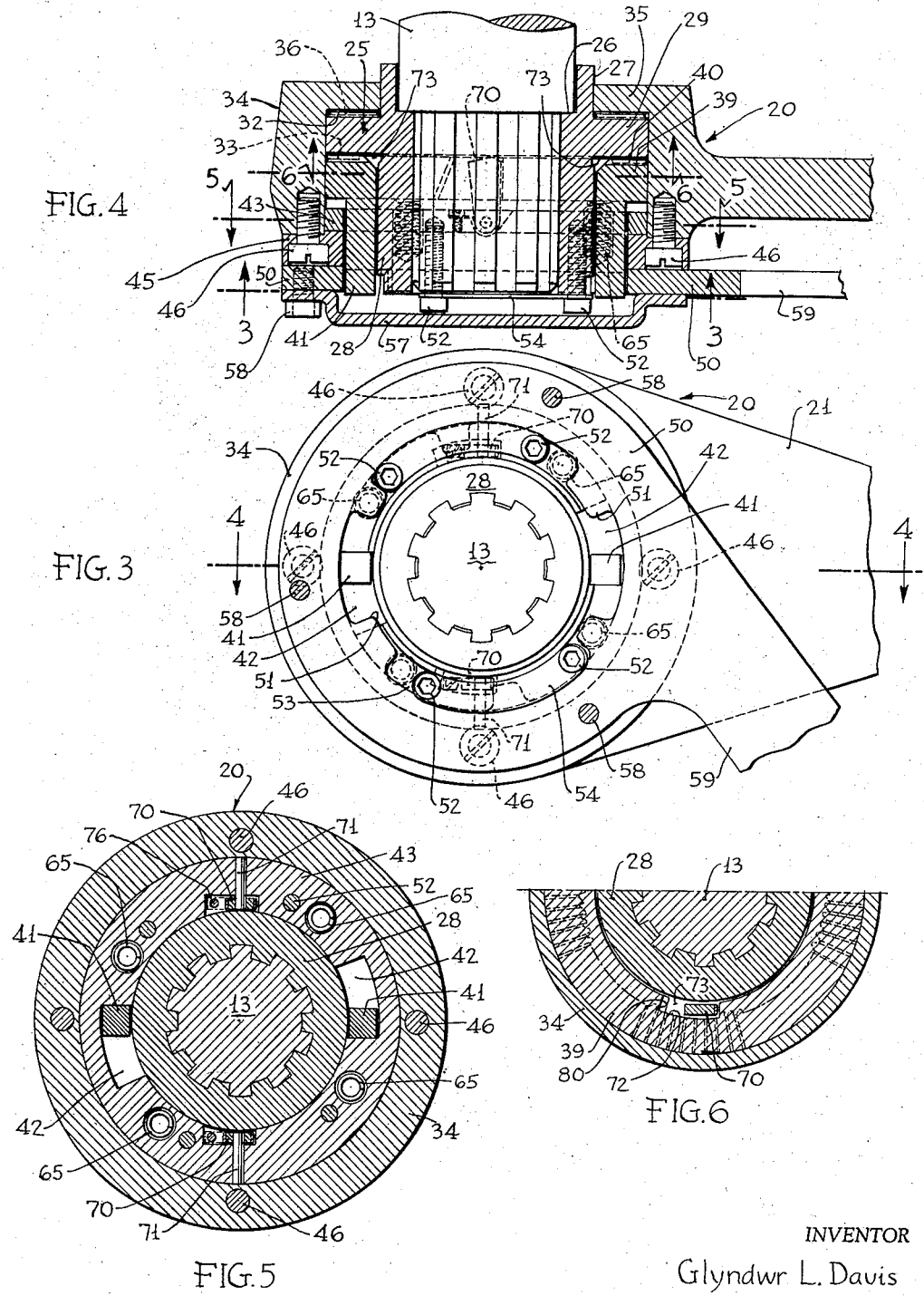

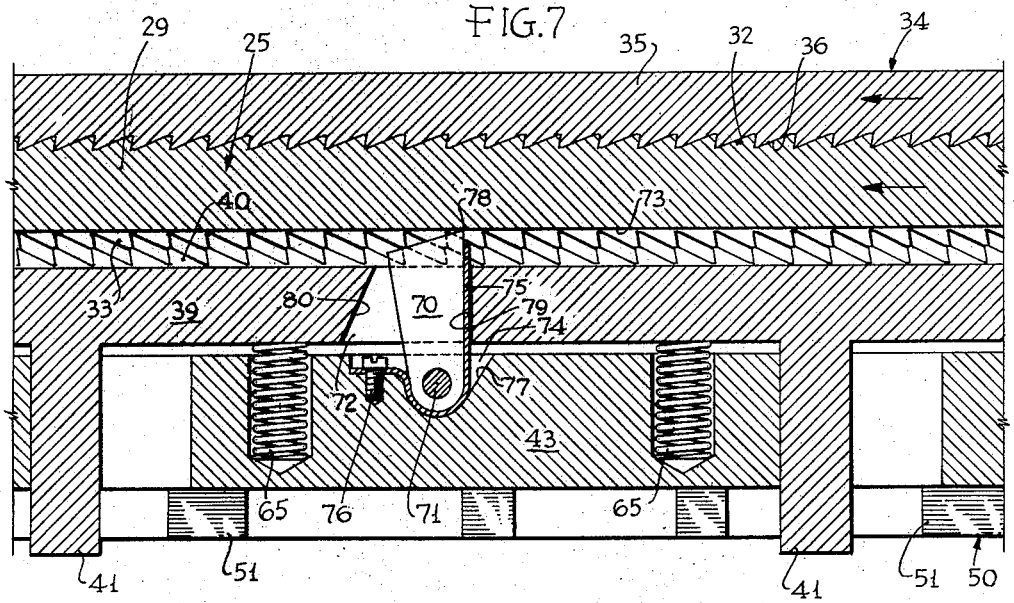
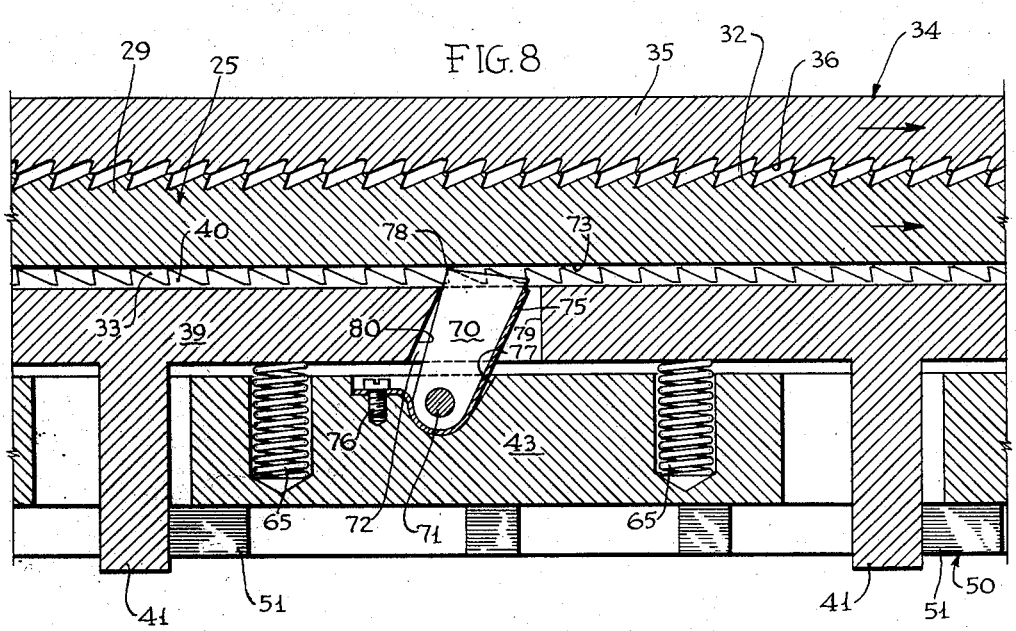

United States Patent Office 2,850,123
Patented Sept. 2, 1958

2,850,123

BRAKE ADJUSTING APPARATUS

Glyndwr L. Davis, Scranton, Pa.

Application May 11, 1956, Serial No. 584,362

12 Claims. (Cl. 188—196)

This invention relates to brake adjusting apparatus and has for an object the provision of improvements in this art.

A particular object of the invention is to provide brake operating apparatus having means for preventing excess take-up in case the cam shaft fails to return properly.

Another object is to provide means for preventing excess take-up which is simple in construction and which does not cause excessive wear on the parts with which it is associated and which will itself have long service life without excessive wear.

The above-mentioned and other objects and the advantages of the invention will be apparent from the following description of a specific embodiment, reference being made to the accompanying drawings, wherein:

Fig. 3 is an end elevation with the end cover removed;

Fig. 4 is an axial section taken on the line 4—4 of Fig. 3;

Fig. 5 is a transverse section taken on the line 5—5 of Fig. 4;

Fig. 6 is a partial transverse section taken on the line 6—6 of Fig. 4;

Fig. 7 is a partial enlarged developed longitudinal section to show the improved excess take-up preventing means provided hereby, the parts being shown in the brake-applied or take-up preventing position; and Fig. 8 is a view similar to Fig. 7 but showing the parts in the brake-off or take-up permitting position.

For purposes of illustration the means for preventing overadjustment, to which the present invention is particularly directed, is herein shown to be associated with brake adjusting apparatus which is similar to that disclosed in the patent to Roy H. Shively, No. 2,697,497, but it will be apparent that it might well be associated with other brake adjusting apparatus.

The brake cam shaft operating and adjusting mechanism is made as a self-contained unit which can be placed on the cam shaft and connected for operation by the same power device which normally operates the cam shaft when the adjusting unit is not used. This general assembly and its operation will first be described; then the improved mechanism for preventing false take-up will be described.

Figure 1:
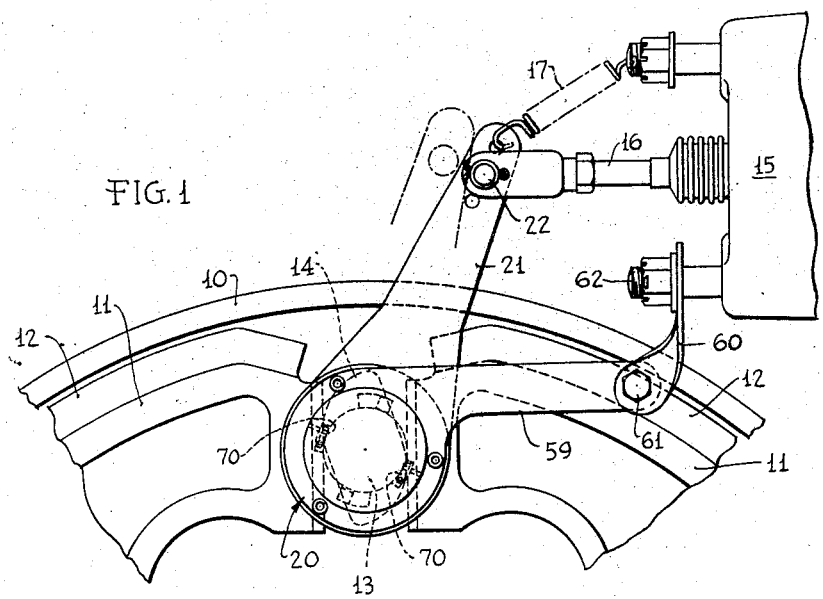
Fig. 1 is an end elevation of the brake operating cam shaft of an automotive vehicle together with the related operating and adjusting means, the view also showing part of the brake shoes and drum.

The brake drum 10, the brake shoes 11 with linings 12, the cam shaft 13 with cam 14, the power cylinder 15 with piston rod 16, and return spring 17 for an actuating arm secured to the cam shaft, constitute normal parts of larger sized brake installations as found on trucks, buses, trailers and the like. The usual actuating arm is not shown here; instead, an adjuster unit 20 which includes an arm 21 for the same purpose is shown. The outer end of the arm 21 is connected to the end of a piston rod 16 by a pivot pin 22. In Fig. 1 the arm 21 is shown in retracted or brake-off position in solid lines and in extended or brake-on position in dotted lines.

As is well known, there must be a small clearance between the brake lining and drum when the brakes are off or the brakes will drag. In normal brake installations where no adjuster is provided, this clearance space increases as the brake lining becomes worn, and it is necessary for the piston rod of the power cylinder to make longer and longer strokes until a point is reached at which with the maximum stroke of the piston rod the brakes will not hold. At such stage, or usually before such an advanced stage of wear is reached, an adjustment will be made to place the cam and its shaft in a more advanced position when the piston rod is in its retracted position. There may be other means provided for making the take-up if it is desired to use the cam in a given range of travel, but the cam advancing type of adjustment will be followed herein because the adjuster with which it is shown is of the type which is designed to advance the cam.

The brake adjusting device 20 is made as a self-contained unit which can be pushed endwise upon the splined end of the cam shaft 13 and there secured. It includes an internally splined drum gear member 25 which is pushed on the end of the cam shaft until a shoulder 26 therein engages a mating shoulder of the cam shaft. The drum gear member occupies a fixed axial position on the shaft, which position may be maintained by force-fitting the drum gear member on the shaft, by end retaining means, or otherwise.

Figure 2:
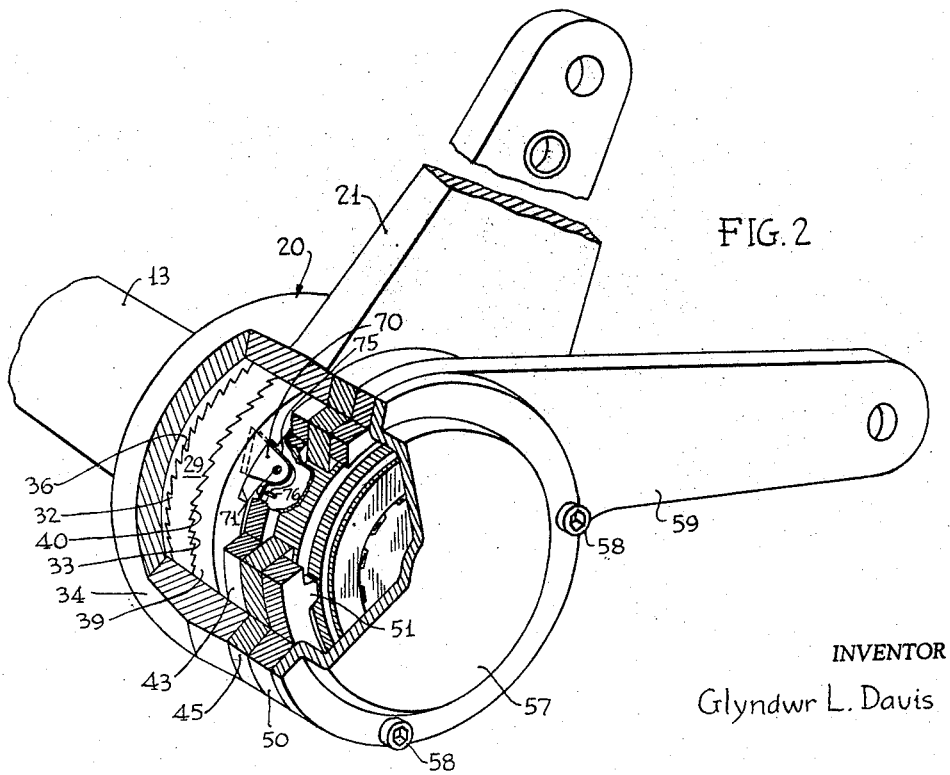
Fig. 2 is a perspective view of the operating and adjusting device alone.

At the end toward the cam, which will be referred to as the inner end although it is actually the outer end in the assembly as installed, the drum gear member 25 is provided with a short hub 27 and at the outer end is provided with a longer hub 28. Between these hubs there is provided an outer drum ratchet gear body 29 which is formed with an annular set of ratchet gear teeth on each axial face. As is most readily seen in Fig. 2, the two annular sets of teeth of this drum ratchet gear 29 are faced in the same direction. The set of teeth 32 on the outer end or side of the drum 29 is the operating set for applying the brake and the set 33 on the inner end or side of the drum is the adjusting set.

A casing 34 closely surrounds the drum ratchet gear 29 and has its inner end 35 rotatably mounted on the short hub 27 of the ratchet gear 29. Interiorly of this end 35 the casing is provided with an annular set of axially facing operating ratchet gear teeth 36 which mates with the set of operating ratchet gear teeth 32 on the drum gear 29.

On the outer end of the drum gear 29 there is mounted an annular adjusting pawl ring gear 39 having an annular set of axially facing adjusting ratchet gear teeth 40 which mates with the set of adjusting ratchet gear teeth 33 on the drum gear 29. The outer circumferential surface of the pawl ring gear 39 is closely surrounded by the casing 34 and has relative rotation therewith.

A plurality of axially extending projections 41 protrude from the outer end of the pawl ring gear 39, these projections having a limited oscillating motion within arcuate slots 42 of a fixed anchor ring 43 which has a turning fit at its inner surface with the gear hub 28 and a turning fit at its outer surface with the casing 34.

An end ring 45 secured to the end of the casing 34, as by cap screws 46, retains the casing on the drum gear 29 and associated parts within the casing.

An anchor plate 50 outside the casing is provided with circumferentially spaced radially inwardly directed sector projections 51 which are disposed in the same annular zone as the studs or projections 41 and which axially overlie the anchor ring 43 in such manner that the projections 51 may be turned circumferentially to limit the arcuate oscillatory movement of the studs or projections 41 to a stroke of less length than the arcuate length of the slots 42. Set screws 52 passing through arcuate slots 53 in the plate 50 and threaded in holes in the anchor ring 43 clamp arcuate clips 54 against the plate 50 and lock the ring and plate together so that the predetermined net length for which the arcuate slots are adjusted is fixed against shifting during operation.

The entire casing assembly is covered to exclude dust and dirt and to retain lubricant by a cap plate 57 secured to the anchor plate, as by cap screws 58.

An integral anchor arm 59 extends outward in a general radial direction from the anchor plate 50 and is connected to a fixed anchorage (Fig. 1) as by a link 60 and bolt 61. The anchorage here is shown as a stud bolt 62 carried by the operating air cylinder 15.

Within the casing all of the ratchet gear teeth are urged axially into meshing relationship by springs 65 carried by the anchor ring 43, the ends of the springs bearing against the axially outer end of the pawl ring gear 39.

From the above description and from the disclosure of the above-mentioned Shively patent it will now be seen that for each forward stroke of the casing and its operating gear teeth 36 the drum ratchet gear teeth 32 and drum will be moved through an equal arc. On the other end of the drum gear the teeth 33, being pressed into mesh with the teeth 40 of the pawl ring gear, carry the pawl ring gear around until the projections 41 strike the abutment ends of their slots and thereafter the teeth 33 will ride up on the teeth 40 to push the pawl ring axially outward against the springs 65, as shown in Fig. 7. If the brake is in proper adjustment, the teeth 33 do not move past the peaks of the teeth 40 and when the piston rod and operating arm 21 return to their off position, the parts will be restored to their original position.

However, if the brake lining has worn sufficiently, the piston rod and operating arm 21 will be required to move so far in applying the brake that the teeth 33 do advance past the peaks of the teeth 40 and when the operating arm and casing are returned to the off position, the pawl ring gear will hold the drum gear while the casing turns further to reach its off position, and this will cause the casing to move axially against the action of the springs and cause the teeth 36 of the casing to ride over the peaks of the teeth 32 and take up a tooth distance. Fig. 8 shows the position of parts just as the operating ratchet teeth are in peak position.

The brake cam will thus be held in an advanced position to take up the brake clearance, and at the next brake applying action the brakes will be tightened within the normal stroke of the piston rod.

The above-described operation is based upon the assumption that the brake cam 14 will be returned to its off position by springs or other means within the brake drum assembly or by friction of tooth contact within the adjuster assembly.

If for any reason the cam shaft should fail to return to the release position, it will hold the drum gear against return, and when the operating arm 21 and casing 34 return to the off position, the teeth 36 of the casing will pass one or more teeth 32 of the drum gear. This false operation will either leave the brake set or will cause overapplication and possibly breakage when the brake piston next operates.

Generally considered, means have already been suggested for holding the mating operating teeth of an adjuster against separating movement on the return stroke until the parts are near their fully off position and thereby forcibly returning the cam shaft to its release position to avoid false take-up. However, all such means with which applicant is acquainted comprise spacing parts which directly engage the tops of the ratchet teeth, and this not only causes rapid wear on the spacing parts, but also causes very rapid wear on the teeth so that they soon fail to operate properly.

According to the present invention, improved means are provided for locking the operating ratchet gear teeth against separation except near the off position. This tooth-locking mechanism is generally indicated and positionally defined in Figs. 1 to 6 and is diagrammatically shown in greatly enlarged developed section in Figs. 7 and 8. Ring 45 is omitted in Figs. 7 and 8 for clarity.

This tooth-locking mechanism for cam shaft return comprises one or more dogs or sears 70 which are pivotally mounted on the anchor ring 43, as on pivot pins 71, and which pass through slots 72 in the adjusting ring gear 39 to such distance that their ends can engage a smooth annular surface or groove 73 on the drum gear body 29, as best shown in Figs. 4 and 6.

The dog or sear 70 is urged upward out of the recess 74 in which its pivoted end is carried by a leaf-type spring 75 which may be held in any suitable manner, as by soldering, by coiling about the pivot pin, or by a screw 76, as shown by way of example. One end 77 of the recess 74 is inclined and serves as a stop when the dog is moved to an extreme position against its spring.

The end of the dog 70 is bevelled and when the longer side ending at the tip 78 stands in an axial direction or at right angles to the transverse face of the anchor ring 43, the tip rides upon the annular surface 73 of the drum gear and forms a non-yielding spacer, chock or filler between the drum gear and anchor ring 43, and since the anchor ring is held by the casing in rigid axial relationship with the end of the casing having the operating ratchet teeth 36, this prevents axial movement of the casing and in turn locks together and prevents separation of the two sets of operating ratchet gear teeth 32 and 36.

Fig. 7 shows the parts at the end or very near the end of the brake applying movement, the exact point being dependent on the extent of lining wear. Here it will be seen that the adjusting ring gear, as it started to move with the drum gear 29, moved its slot 72 and allowed the dog 70 to rise to a distended position. Thereafter the square end 79 of the slot engaged the spring and dog and held them up.

The axial projection 41 of the adjusting ring gear 39 strikes the end of the slot 42 in the anchor ring 43 and thereafter the teeth 33 of the drum gear ride up on the teeth of the adjusting gear ring and this forces the adjusting gear ring to move axially against the springs 65. This position is shown in Fig. 7. As stated hereinabove, if the brake lining is sufficiently worn, the adjusting teeth will jump a tooth distance and hold in the new advanced position.

The parts now return to the off position, the adjusting ring gear 39 turning back with the drum gear until the axial projection 41 engages the slot adjusting radial projection 51 of the anchor plate—or the other end of the slot 42 if the parts are adjusted for greatest length of movement. Its spring holds the dog up for a considerable part of the return stroke, the dog not being affected by the adjusting gear; but near the end of the stroke the inclined end 80 of the slot 42 engages the forward side of the dog and pushes it down, as shown in Fig. 8. This permits the casing to move axially if necessary and the operating gear teeth 36 of the casing can ride up on the teeth 32 of the drum gear, the latter being held against further return movement by the teeth of the adjusting ring gear. This condition is shown in Fig. 8. If a tooth space has been taken up on the out stroke, the drum gear will be held in an advanced position and the adjusting gear teeth will jump a space.

It is to be noted that the length of the axial space between the adjusting ring gear 39 and the anchor ring 43 is more than one tooth depth but less than twice the tooth depth so that only one mating pair of tooth sets can be separated at the same time.

Another point to be noted is that in resetting the length of the arcuate slot 53 it is actually the anchor ring 43 which is moved circumferentially rather than the anchor plate 50 because the latter is held in fixed position by the arm 59, so that it is the brake applying end of the stroke which is varied by the setting which is made. This conforms to the shortened piston rod stroke for which the slot length setting is made, the length of piston stroke, of course, depending on the amount of turning movement which the cam shaft and cam are required to make for the particular brake which is being operated.

The slot 72 in the anchor ring 39 will move relative to the dog in a direction to let the dog rise higher when the effective length of the slot 53 is shortened by resetting; but in no case will the resetting shorten the slot 53 enough to cause the dog to rise in the off position to the extent that it will prevent separation of the operating ratchet gear teeth 32 and 36.

It will be seen from the above description that the dog or sear rises on the outstroke to force the operating ratchet gear teeth together while allowing the adjusting ratchet gear teeth to slip past each other if necessary to take up the brake, but that the dog moves down at the end of the return stroke to allow the operating ratchet gear teeth to slip past each other if an adjustment has been made. The dog does not engage the teeth at any time but rather a smooth annular surface 73, so that there is but little wear. Also, since the dog is mounted to turn about a pivot pin, there is little wear here. Since the dog is carried by the anchor ring and not by the adjusting ring gear as in previous forms, the adjusting ring gear is left free for its usual functions. Furthermore, since the action of the dog does not depend on an element dropping into a hole in the retracted position, there is much less chance of parts sticking and causing improper operation than in the previous forms.

A spring is shown for causing the dog to rise, but it will be seen that its action is not wholly dependent on the spring since the ends of the slot 72 practically assure the proper operation of the dog without the spring.

While one embodiment of the invention has been shown for purposes of illustration, it will be obvious that there may be various embodiments and modifications within the general scope of the invention.

What is claimed is:

1. In brake operating and wear take-up apparatus, in combination, a brake operating cam shaft, a drum gear which is fixed in position on said shaft, said drum gear having operating ratchet gear teeth on one axial end or face and adjusting ratchet gear teeth on the other end or face, a casing surrounding said drum gear and mounted for axial and circumferential movement relative thereto, said casing having operating gear teeth on one axial end which mesh with the operating ratchet gear teeth on said drum gear, an adjusting ring gear mounted in said casing for limited turning and axial movement relative thereto, said adjusting ring gear also having axial movement and turning movement relative to said drum gear and having adjusting ratchet gear teeth meshing with the adjusting ratchet gear teeth on said drum gear, an anchor ring mounted in said casing behind said adjusting ring gear and having relative turning movement with respect to said casing and adjusting ring gear but being fixed axially relative to the casing, anchor means holding said anchor ring against turning movement, means resiliently urging said adjusting ring gear and said anchor ring axially apart, means for limiting the turning movement of said adjusting ring gear relative to said anchor ring so that a tooth space will be jumped between the adjusting ratchet gear teeth between the drum gear and the adjusting ring gear when the casing moves in one direction, as when the brakes are applied if the wear is sufficient, and that the adjusting ratchet ring gear and drum gear will be held near the end of the return stroke so the casing may move axially and turn further to jump a tooth space of the operating gear teeth between the drum gear and casing, and means to prevent relative movement between the operating gear teeth at the outer part of the stroke, said last-mentioned means including a dog or sear pivoted on the anchor ring and extending through a slot in the adjusting ring gear to engage the end of the drum gear body when the dog is swung up and to move down near the end of the back stroke to permit the operating gear teeth to separate.

2. Apparatus as set forth in claim 1 which is further characterized by the fact that said dog is inclined on its end so as to have an axially short forward side and an axially long rearward side, the dog presenting its long side between the anchor ring and drum gear member when the dog is raised and presenting its short side between them when the dog is moved down.

3. Apparatus as set forth in claim 1 which further includes a spring for urging the dog to a raised position.

4. Apparatus as set forth in claim 1, further characterized by the fact that the slot in said adjusting ring gear is provided with end surfaces which are formed and arranged to raise and lower the dog at the proper times.

5. Apparatus as set forth in claim 4, further characterized by the fact that the slot end surface which elevates the dog is generally parallel with a plane through the shaft axis and that the slot end surface which moves the dog down is inclined circumferentially relative to a plane through the shaft axis.

6. Apparatus as set forth in claim 1, further characterized by the fact that said drum gear body is provided with a smooth annular surface along which the end of the dog is adapted to operate.

7. Apparatus as set forth in claim 4 which further includes a spring for raising the dog into engagement with the drum gear body.

8. In brake operating apparatus which includes a cam and cam shaft, a drum gear disposed on the cam shaft for turning it, said drum gear having operating ratchet teeth at one axial end and adjusting ratchet teeth at the other axial end, an operating and adjusting casing mounted for turning movement on said cam shaft and having limited axial movement relative to said drum gear, the casing having means adapted to be connected to a power device for forward movement to apply the brake and rearward movement to release the brake, said casing carrying operating ratchet teeth at one end adapted to engage the operating ratchet teeth of the drum gear to apply the brake, an adjusting gear in the casing having axial and turning movement relative to both said drum gear and to said casing, said adjusting gear having adjusting ratchet teeth meshing with the adjusting ratchet teeth of the drum gear which are shaped to ride over each other in the forward movement of the casing and drum gear, an anchor ring mounted within said casing and having a connection to an anchor part holding it against turning movement, the anchor ring and casing having turning movement relative to each other but being movable axially together, coacting means between adjusting gear and said anchor ring providing limited turning movement between them, means between the anchor ring and adjusting gear urging them apart axially, that improvement which comprises axially distensible and retractable means carried by said anchor ring and extending across said adjusting gear and having relative circumferential movement with respect thereto for acting upon said drum gear to move it axially relative to the casing to lock the operating ratchet teeth of the casing and drum gear against separation when the casing and drum gear move away from the off position, as toward brake applying position, but which retracts to allow the operating teeth to separate when the casing moves reversely and nears the off position.

9. Apparatus as set forth in claim 8, further characterized by the fact that said adjusting gear is provided with a through slot in which said axially distensible means carried by the anchor ring passes to enable it to act on said drum gear.

10. Apparatus as set forth in claim 8, further characterized by the fact that said drum gear is provided with an annular zone apart from the adjusting ratchet teeth which is engaged by said axially distensible means carried by the anchor ring.

11. Apparatus as set forth in claim 8, characterized by the fact that said axially extensible means carried by said anchor ring comprises a swinging dog or sear provided on its end toward the drum gear with an end which is inclined circumferentially.

12. Apparatus as set forth in claim 8, characterized by the fact that said axially extensible means carried by said anchor ring comprises a swinging dog or sear and that said adjusting gear is provided with a slot through which said dog passes, said slot having an axially parallel wall at one end and an axially inclined wall at the other end for urging the dog up in one direction of turning to move the drum gear axially relative to the anchor ring and casing to cause the operating gear teeth between the drum gear and casing to mesh and for urging the dog down in the reverse direction of rotation and toward the end of the turning movement of the casing for releasing the operating gear teeth from each other.

References Cited in the file of this patent
UNITED STATES PATENTS

| | | |
|---|---|---|
| 2,648,996 | MacDougall | Aug. 18, 1953 |
| 2,697,497 | Shively | Dec. 21, 1954 |